United States Patent Office 3,211,786
Patented Oct. 12, 1965

3,211,786
PROCESS FOR THE MANUFACTURE OF
ARYLSULFOCHLORIDES
Paul Mueller, Albert Friedrich Buri, Hansruedi Pfister, and Robert Trefzer, all of Basel, Switzerland, assignors to Ciba Corporation, a corporation of Delaware
No Drawing. Filed Nov. 14, 1960, Ser. No. 68,622
Claims priority, application Switzerland, Nov. 24, 1959, 80,975/59; Dec. 11, 1959, 81,778/59
8 Claims. (Cl. 260—543)

The present invention provides an improved process for the manufacture of anhydrous aromatic sulfochlorides, for example acetylsulfanilic acid chloride, para-toluenesulfochloride, para-nitrobenzenesulfochloride, $\alpha$- and $\beta$-naphthalenesulfochloride and 5-chloraniline-2,4-disulfochloride.

The arylsulfochlorides are important intermediates, for example for the manufacture of sulfonamides used as medicaments, or of dyestuffs. It is of considerable importance to the storing and working up of the sulfochlorides that they should be manufactured in a very great purity, dry and free from acid.

A great difficulty is the fact that on contact with water the sulfochlorides decompose very easily and form products containing acid, since in the conventional manufacturing process the sulfochlorides are obtained by reacting an aromatic compound with an excess of chlorosulfonic acid, pouring the reaction mixture into ice water and filtering off the water-insoluble sulfochloride. As a rule the resulting filter cake contains 40 to 70% of water, which is partially present on the surface and partially occluded in the crystals. Its removal, more especially at an elevated temperature, is accompanied by extensive decompositions of the acid chloride.

Accordingly, a variety of processes have been developed to accelerate the removal of water from the filter cake or to enable its removal being performed at a lower temperature.

Inter alia, it has been proposed to suspend the filter cake in a water-immiscible organic solvent, the suspension then being filtered and the filter residue dried (see U.S. Patent No. 2,383,128 granted August 21, 1945, to Martin Everett Hultquist). According to another process the filter cake is stirred with warm nitrobenzene until the arylsulfochloride has dissolved; the organic layer is then separated and the sulfochloride is isolated by crystallization (see U.S. Patent No. 2,369,023 granted February 6, 1945 to Harold W. Coward et al.).

The present invention is based on the observation that very pure arylsulfochloride is obtained in a simpler way and a better yield, when the abovementioned chlorosulfonation mixture is run into a mixture of water and a water-immiscible organic solvent which is inert toward the sulfochlorides and the organic layer is separated. The water may also be used in the form of ice.

It is an advantage of the present process that, surprisingly, on being poured into the solvent mixed with water or ice the sulfochloride immediately dissolves or is suspended therein and in the dissolved or suspended form is no longer affected by water.

The resulting solution or suspension respectively of the sulfochloride can be rapidly separated from water and completely freed from acid and washed neutral, for example with a dilute solution of an alkali metal hydroxide, carbonate or bicarbonate, such as sodium or potassium hydroxide, carbonate or bicarbonate, or of an alkaline earth metal hydroxide or carbonate, such as calcium hydroxide or carbonate, trisodiumphosphate, sodium acetate or the like.

The small residue of water remaining in the solution or suspension of the sulfochloride can be removed by adding a dehydrating agent such as calcium chloride, magnesium sulfate or the like, or by azeotropic distillation.

The sulfochloride is worked up in the usual manner by concentration until crystallization sets in or by complete evaporation or by filtration. If desired, the anhydrous sulfochloride solution can be used as it is in the preparation of other products.

The chlorosulfonation mixture used as starting material is prepared in the known manner by reacting an aromatic compound of the benzene or naphthalene series, such as benzene, naphthalene, or an alkyl or alkoxy compound thereof, or a halogen, amino or nitro derivative thereof, with chlorosulfonic acid, if desired in the presence of a halogenating agent such as sulfuryl chloride, phosphorus trichloride, phosphorus oxychloride, phosphorus pentachloride, thionyl chloride, or of an alkali metal halide such as sodium chloride, potassium chloride or lithium chloride.

As solvent there may be used any one of the known water-immiscible organic solvents, for example a hydrocarbon such as nitrobenzene, or a chlorinated hydrocarbon such as tetrachloroethane, acetic acid esters such as its butyl or isobutyl ester, ethers such as diisobutyl ether, ketones such as methyl isobutyl ketone or cyclohexanone. For the isolation of solid arylsulfochloride it is of advantage to use tetrachlorethylene.

Depending on the solubility of the sulfochloride in the organic solvent or on the ease with which the organic layer can be separated, a lower or higher temperature may be maintained while the chlorosulfonation mixture is being run into the aqueous-organic mixture and/or while the two phases are being separated. An advantageous temperature range is between $-10°$ and $+50°$ C., the sulfonation mixture being run in more or less rapidly.

To facilitate the separation of the organic from the aqueous phase, there may be added to the mixture salts, such as sodium chloride, formates, acetates or the like.

The process is particularly suitable also for the continuous working up of chlorosulfonation mixtures. For such procedure nitrobenzene is advantageously used as solvent and the solution or suspension in nitrobenzene which contains the arylsulfochloride heated to at most 80° C. for a short while by the flow-through method, the aqueous layer then removed and the nitrobenzene solution azeotropically dried under reduced pressure.

The following examples illustrate the invention.

*Example 1*

300 grams of acetanilide are added at 60° C. to 830 cc. of chlorosulfonic acid. The mixture is stirred for 1 hour at 60° C. and then in the course of about 30 minutes added dropwise to a vigorously stirred imxture of 2500 grams of water and 2500 grams of ice, containing 400 grams of sodium chloride, and 5 liters of nitrobenzene, while maintaining the temperature of the mixture between 15 and 20° C. On completion of the dropwise addition the mixture is stirred on for 10 minutes and then left to itself. The mixture separates immediately and forms an acid aqueous phase and a lower, milky nitrobenzolic phase. The latter is separated, washed twice with 1 liter of saturated sodium bicarbonate solution on each occasion and once with 1 liter of water until neutral, whereupon the milky turbidity disappears. The separated nitrobenzolic solution is subjected to azeotropic dehydration in vacuo, and the nitrobenzene is then distilled off in vacuo, to yield 402 grams (=77.5% of theory, calculated on the acetanilide used) of acetylsulfanilic acid chloride melting at 143–144° C. of 99.4% purity. The content of free acid, expressed as acetylsulfanilic acid, amounts to 0.6%.

Example 2

A chlorosulfonation mixture prepared from 300 grams of acetanilide as described in Example 1 is vigorously stirred dropwise at −5° to +5° C. into a mixture of 3000 grams of ice, 300 grams of sodium chloride and 2 liters of butylacetate. The mixture is stirred on for 10 minutes and the two phases are then allowed to separate. The supernatant butylacetate phase is separated and further worked up as described in Example 1; yield: 388 grams (=75% of theory, calculated on the acetanilide used) of acetylsulfanilic acid chloride melting at 143.4–144.2° C. Purity: 98.8%. Content of free acid: 0.5%, expressed as acetylsulfanilic acid.

Example 3

A chlorosulfonation mixture prepared from 300 grams of acetanilide as described in Example 1 is vigorously stirred dropwise at 40° C. into a mixture of 3 liters of water, 300 grams of sodium chloride and 2.7 liters of nitrobenzene. After stirring on for 10 minutes the supernatant nitrobenzolic phase is separated and washed until neutral as described in Example 1. The nitrobenzolic solution is then dehydrated by azeotropic distillation in vacuo. A nitrobenzolic solution of 15.4% by weight strength of acetylsulfanilic acid chloride is obtained. (Yield: 80.8% of theory, calculated on the acetanilide used.) Analysis does not reveal the presence of free acid.

Example 4

A chlorosulfonation mixture prepared by reacting 100 grams of acetanilide with 243 cc. of chlorosulfonic acid at 60° C. is vigorously stirred dropwise into a mixture of 750 grams of water of about 5° C. and 360 cc. of nitrobenzene, during which the internal temperature should not rise above 15° C. On completion of the addition the whole is stirred for 10 minutes longer and then allowed to stand, whereupon it separates into a lower, turbid, nitrobenzolic suspension and a supernatant clear, aqueous, acid phase. The nitrobenzolic layer is separated and while being stirred it is neutralized with about 620 cc. of saturated sodium bicarbonate solution at 15° internal temperature and a pH value of 6.5. After having been allowed to stand for a short time, the lower nitrobenzolic suspension is again separated and subjected to azeotropic distillation in vacuo. Finally there is obtained an anhydrous nitrobenzolic solution of about 25% by weight strength of acetylsulfanilic acid chloride having a temperature of about 40° C. The content of sulfochloride corresponds to a yield of about 80% of theory, calculated on the acetanilide used. The analysis performed after drying does not reveal the presence of free acid.

Example 5

With strong external cooling, 384 g. of meta-chloraniline are introduced under the surface of 2100 g. of chlorosulfonic acid in a reaction vessel in such manner that the internal temperature does not rise above 60°. When the addition is complete, the internal temperature is raised to 130° C. for 2 hours. The reaction mass is then cooled to 60–70° C. and 1074 g. of thionyl chloride added dropwise. The reaction mass is maintained at this temperature for another 2 hours, then cooled to 25° C. and the resulting chlorosulfonation mixture introduced into a mixture of 3400 g. of nitrobenzene and 500 cc. of ice water. By continuously adding ice, the internal temperature is maintained at 5° C. during this operation. Finally, 2 liters of ice water are added and, after being stirred for a short while, the mixture is left to itself. The aqueous upper phase is then separated as completely as possible, and the remaining lower phase, i.e., the nitrobenzolic solution, then dehydrated by the addition of 400 g. of sodium sulfate. Dehydration can also be accomplished by azeotropic distillation. This nitrobenzolic solution contains 5-chloraniline-2,4-disulfonic acid chloride. The yield is about 80%.

Example 6

A chlorosulfonation mixture, prepared from 136 g. of acetanilide and 580 g. of chlorosulfonic acid as described in Example 1 is introduced with vigorous stirring into a mixture of 463 cc. of tetrachlorethane and 500 g. of ice at an internal temperature of 0–5° C. The mixture is slowly stirred for another 10 minutes and then left to itself, an upper, aqueous, acid phase separating, which is removed as completely as possible. The lower, turbid and slightly viscous tetrachlorethane layer is stirred twice with 500 cc. of ice water each time, and finally washed neutral with a cooled sodium bicarbonate solution, as described in Example 1. The tetrachlorethane phase is evaporated to dryness in a vacuum to obtain 187 g. of acetyl sulfanilic acid chloride in the form of a white to cream-colored powder. The yield is about 80% of theory, calculated on the acetanilide used.

Example 7

20 cc. of a chlorosulfonation mixture prepared according to Example 1 are poured onto 200 g. of ice and 200 cc. of methyl-isobutyl ketone, the internal temperature of the vigorously stirred mixture being maintained at 0° C. For separation of the layers, the whole is then allowed to stand. Two distinctly separate layers form of which the upper, the methyl-isobutyl ketone phase, contains the acetylsulfanilic acid chloride. This phase is separated, washed 4 times with ice water and then evaporated to dryness under a vacuum. There are obtained 8.86 g. of dry acetyl-sulfanilic acid chloride, that is to say, a yield of at least 80% of theory, calculated on the acetanilide used.

Example 8

A chlorosulfonation mixture, prepared from 100 g. of acetanilide according to Example 4, is added dropwise within a short time while stirring vigorously to a mixture of 750 g. of ice water and 360 cc. of nitrobenzene. Care should be taken to keep the internal temperature from rising above 15° C. When the addition is complete, stirring is continued for at most 10 minutes. The mixture is then left to itself, and there is formed a lower, turbid nitrobenzolic suspension and an upper, clear, aqueous acid phase. The former is separated and, while being stirred, at an internal temperature of 15° C. given a pH of 6.5 with about 620 cc. of saturated sodium bicarbonate solution. It is allowed to stand for a short while, the lower, nitrobenzolic layer is separated, brought into solution by raising its temperature to about 60 to 65° C. by flow heating, and the aqueous layer which separates is removed. The nitrobenzolic solution is azeotropically dried by flow heating to about 60–65° C. under a pressure of about 6 mm. Hg. There is obtained a dry nitrobenzolic solution having a temperature of about 60° C. and a content of acetylsulfanilic acid chloride of about 25% by weight which is practically free from free acids. The yield of acetylsulfanilic acid chloride is about 83% of theory, calculated on the acetanilide used.

Example 9

A chlorosulfonation mixture, prepared from 100 g. of acetanilide and 427 g. of chlorosulfonic acid according to Example 4, is introduced into a mixture of 60 cc. of tetrachlorethylene and 370 g. of ice with vigorous stirring. By the addition of 370 g. of ice, the internal temperature is kept at about 0° C. during the introduction. The acetylsulfanilic acid chloride which precipitates is filtered off, washed with ice water, slurried in 370 cc. of ice water, and neutralized at 0–5° C. with saturated sodium bicarbonate solution. After another filtration, the resulting precipitate is dried under a pressure below 12 mm. Hg at a temperature not exceeding 60° C. to obtain an about 80% yield (calculated on the acetanilide) of dry acetylsulfanilic acid chloride of more than 99% purity.

What is claimed is:

1. In the isolation of an anhydrous aromatic sulfochloride from the reaction of an aromatic compound selected from the group consisting of a monocyclic aromatic and a bicyclic aromatic compound with chlorosulfonic acid, the step which comprises running the chlorosulfonation reaction mixture into a vigorously agitated mixture of water and an inert water-immiscible organic solvent at a temperature between $-10°$ and $+50°$ C. said solvent having a boiling point between about 119° and about 211° C. and being selected from the group consisting of nitrobenzene, tetrachloroethane, butyl acetate, methyl isobutyl ketone, diisobutyl ether, tetrachloroethylene and cyclohexanone and isolating the anhydrous aromatic sulfochloride.

2. Process according to claim 1, wherein nitrobenzene is used as the organic solvent.

3. Process according to claim 2, wherein the solution of the aromatic sulfochloride in nitrobenzene is heated to at most 80° C. for a short while by the flow-through method, the aqueous layer is separated, and the nitrobenzolic solution dried azeotropically in vacuo.

4. Process according to claim 1, wherein tetrachlorethylene is used as the organic solvent.

5. Process according to claim 1, wherein butyl acetate is used as the organic solvent.

6. Process according to claim 1, wherein a methylisobutyl ketone is used as the organic solvent.

7. Process according to claim 1, wherein chlorosulfonation mixture containing acetylsulfanilic acid chloride is used as starting material.

8. Process according to claim 1, wherein a chlorosulfonation mixture containing 5-chloraniline-2,4-disulfonic acid chloride is used as starting material.

References Cited by the Examiner

UNITED STATES PATENTS

| 2,350,127 | 5/44 | Porter et al. | 260—543 X |
| 2,369,023 | 2/45 | Coward et al. | 260—543 |
| 2,508,930 | 5/50 | Richmond | 260—543 |
| 2,965,675 | 12/60 | Novello | 260—543 |
| 2,996,541 | 8/61 | Beinfest et al. | 260—543 |
| 3,108,137 | 10/63 | Barton et al. | 260—543 |

FOREIGN PATENTS

| 122,129 | 8/46 | Australia. |

LORRAINE A. WEINBERGER, *Primary Examiner.*

LEON ZITVER, *Examiner.*